(12) United States Patent
Zheng et al.

(10) Patent No.: US 9,763,078 B1
(45) Date of Patent: Sep. 12, 2017

(54) SUBSCRIBER AWARENESS FOR A MOBILE PRIVATE NETWORK ROUTING SERVICE IN A NETWORK ENVIRONMENT

(71) Applicant: CISCO TECHNOLOGY, INC., San Jose, CA (US)

(72) Inventors: Wenxing Zheng, Westford, MA (US); Kirk McBean, North Wales, PA (US); Srinath Gundavelli, San Jose, CA (US); Dhananjay Shrikrishna Patki, Bangalore (IN)

(73) Assignee: Cisco Technology, Inc., San Jose, CA (US)

( * ) Notice: Subject to any disclaimer, the term of this patent is extended or adjusted under 35 U.S.C. 154(b) by 72 days.

(21) Appl. No.: 14/793,558

(22) Filed: Jul. 7, 2015

(51) Int. Cl.
*H04W 4/00* (2009.01)
*H04W 8/12* (2009.01)
*H04W 8/18* (2009.01)
*H04W 36/08* (2009.01)
*H04W 88/16* (2009.01)

(52) U.S. Cl.
CPC ............ *H04W 8/12* (2013.01); *H04W 8/183* (2013.01); *H04W 36/08* (2013.01); *H04W 88/16* (2013.01)

(58) Field of Classification Search
None
See application file for complete search history.

(56) References Cited

U.S. PATENT DOCUMENTS

| | | | |
|---|---|---|---|
| 7,954,002 B2 | 5/2011 | Qiang | |
| 8,358,602 B2 | 1/2013 | Puthiyandyil et al. | |
| 8,958,787 B2 | 2/2015 | Rydneil et al. | |
| 2010/0091710 A1 | 4/2010 | Jung et al. | |
| 2010/0095007 A1* | 4/2010 | Cherian | H04W 80/045 709/227 |
| 2010/0296481 A1* | 11/2010 | Weniger | H04L 63/0807 370/331 |
| 2010/0322106 A1* | 12/2010 | Qiang | H04W 76/021 370/254 |
| 2010/0323700 A1* | 12/2010 | Bachmann | H04W 36/0066 455/436 |
| 2011/0110286 A1* | 5/2011 | Lu | H04L 12/185 370/312 |
| 2011/0122815 A1* | 5/2011 | Velev | H04W 8/082 370/328 |
| 2011/0246629 A1* | 10/2011 | Savolainen | H04W 60/005 709/220 |
| 2012/0140719 A1* | 6/2012 | Hui | H04W 76/021 370/329 |
| 2013/0139221 A1* | 5/2013 | Gundavelli | H04W 28/02 726/4 |

(Continued)

*Primary Examiner* — Otis L Thompson, Jr.
(74) *Attorney, Agent, or Firm* — Patterson + Sheridan, LLP (57) ABSTRACT

A method provided in one embodiment includes receiving, at a packet gateway, a first binding update message from a mobile access gateway. The first binding update message has a destination address associated with a local mobility anchor. The method further includes extracting at least one session identifier associated with the mobile access gateway from the first binding update message, constructing an option field including the at least one session identifier, and appending the option field to the first binding update message to form a second binding update message. The method further includes sending the second binding update message to the local mobility anchor.

26 Claims, 8 Drawing Sheets

(56) References Cited

U.S. PATENT DOCUMENTS

| | | | |
|---|---|---|---|
| 2014/0233465 A1* | 8/2014 | Aramoto | H04W 48/18 370/328 |
| 2015/0181394 A1* | 6/2015 | Zuniga | H04W 72/005 370/312 |
| 2015/0319662 A1* | 11/2015 | Enomoto | H04W 36/14 370/338 |
| 2016/0330665 A1* | 11/2016 | Zuniga | H04W 36/12 |

\* cited by examiner

SUBSCRIBER AWARENESS FOR A MOBILE PRIVATE NETWORK ROUTING SERVICE IN A NETWORK ENVIRONMENT

TECHNICAL FIELD

This disclosure relates in general to the field of communications and, more particularly, to providing subscriber awareness for a mobile private network routing service in a network environment.

BACKGROUND

Mobile operators are increasingly offering business virtual private network (VPN) services over 3G/4G wireless infrastructure. By leveraging wireless access for the last-mile, operators are able to offer services for building enterprise private VPN clouds, similar to dedicated leased-line service offered by fixed line providers. This approach allows operators to eliminate the costs associated with circuit on the last mile and furthermore allows them to monetize their investments in LTE access. A business VPN service allows enterprises to securely link their remote branch offices over a mobile network without the need for dedicated leased lines, or the use of Internet Protocol Security (IPSec)/Secure Sockets Layer (SSL) based VPN services. An enterprise customer may purchase business VPN service in addition to a data connection for their customer premise equipment (CPE) device in a branch office. Service logic in the mobile gateway ensures that the traffic from certain International Mobile Subscriber Identities (IMSI's) is segmented and is virtual routing and forwarding (VRF)-routed to the customer's multiprotocol label switching (MPLS) network. This eliminates provisioning and service management related challenges (typically present with IPsec/SSL based VPN services) for the enterprise IT and at the same time opens up new business opportunities for mobile operators.

Current solutions for enabling this service tie the service logic to the mobile gateways. However, there is significant interest from operators to have this service logic moved out of the evolved packet core (EPC) and have it reside in service nodes outside the packet gateway (PGW) such as in and MPLS Edge, Gi-LAN, or in a partner SP offering MPLS VPN service. In addition to the requirement for moving certain business services out of the EPC, it is also to have some stickiness between those service functions and the EPC elements. In particular, it is desired that the business VPN service function should be able to leverage the LTE service authorization, or other policy elements, and have this service as an extension to the LTE service.

BRIEF DESCRIPTION OF THE DRAWINGS

To provide a more complete understanding of the present disclosure and features and advantages thereof, reference is made to the following description, taken in conjunction with the accompanying figures, where like reference numerals represent like parts, in which.

DETAILED DESCRIPTION OF EXAMPLE EMBODIMENTS

Overview

A method is provided in one embodiment and includes receiving, at a packet gateway, a first binding update message from a mobile access gateway. The first binding update message has a destination address associated with a local mobility anchor. The method further includes extracting at least one session identifier associated with the mobile access gateway from the first binding update message, constructing an option field including the at least one session identifier, and appending the option field to the first binding update message to form a second binding update message. The method further includes sending the second binding update message to the local mobility anchor.

In particular embodiments, the method further includes modifying a length field value of a length field of the first binding update message to include a length of the option field and recomputing a checksum field value of a checksum field of the first binding update message. In still other particular embodiments, the option field includes one or more session identity portions associated with each session identifier, each session identity portion including a sub-option type field indicative of a type of the session identifier, a length field indicative of a length of the session identifier, and a subscriber identity field including the session identifier.

In particular embodiments, the at least one session identifier includes one or more of a Mobile Station International Subscriber Directory Number (MSISDN) associated with the mobile access gateway, a Network Access Identifier (NAI) associated with the mobile access gateway, an International Mobile Subscriber Identity (IMSI) associated with the mobile access gateway, an Access Point Name (APN) associated with the mobile access gateway, and a Virtual Routing and Forwarding (VRF) name associated with the mobile access gateway.

In other particular embodiments, the method further includes performing packet inspection for determining the binding update message prior to extracting the at least one session identifier. In still other particular embodiments, the option field is a vendor specific mobility option field. In other particular embodiments, the first binding update message is a proxy binding update (PBU) message.

In particular embodiments, the method further includes receiving the second binding update message by the local mobility anchor, determining if the option field is present within the second binding update message, parsing the option field for the at least one session identifier, and copying the at least one session identifier into a binding cache entry in association with the mobile access gateway.

In still other particular embodiments, the method further includes determining, by the local mobility anchor, an original length field value of the length field of the first binding update message, and restoring the original length field value within a length field of the second binding update message. In other particular embodiments, the method further includes sending a binding acknowledgment message to the mobile access gateway via the packet gateway, and setting up one or more tunnels between the mobile access gateway and the local mobility anchor using the at least one session identifier. In other particular embodiments, the method further includes forwarding traffic between a wired or wireless device connected to the mobile access gateway and a server associated with the wired or wireless device using the one or more tunnels.

Logic encoded in one or more non-transitory media is provided in one embodiment that includes code for execution and when executed by a processor operable to perform operations including receiving, from a packet gateway, a binding update message by a local mobility anchor, and determining if an option field is present within the binding update message including at least one session identifier associated with a mobile access gateway. The operations further include parsing the option field for the at least one session identifier, and copying the at least one session identifier into a binding cache entry in association with the mobile access gateway.

In particular embodiments, the operations further include determining, by the local mobility anchor, an original length field value of the length field of the binding update message, and restoring the original length field value within a length field of the binding update message. In other particular embodiments, the operations further include sending a binding acknowledgment message to the mobile access gateway via the packet gateway, and setting up one or more tunnels between the mobile access gateway and the local mobility anchor using the at least one session identifier. In still other particular embodiments, the operations further including forwarding traffic between a wired or wireless device and a server associated with the wired or wireless device using the one or more tunnels.

A network element is provided in one embodiment and includes a memory element configured to store electronic code, a processor operable to execute instructions associated with the electronic code, and a module coupled to the memory element and the processor. The network element is configured for receiving a first binding update message from a mobile access gateway. The first binding update message has a destination address associated with a local mobility anchor. The network element is further configured for extracting at least one session identifier associated with the mobile access gateway from the first binding update message, constructing an option field including the at least one session identifier, and appending the option field to the first binding update message to form a second binding update message. The network element is still further configured for sending the second binding update message to the local mobility anchor.

A network element is provided in one embodiment and includes a memory element configured to store electronic code, a processor operable to execute instructions associated with the electronic code, a binding cache entry table, and a module coupled to the memory element, the processor and binding cache entry table. The network element is configured for receiving, from a packet gateway, a binding update message by a local mobility anchor, and determining if an option field is present within the binding update message including at least one session identifier associated with a mobile access gateway. The network element is further configured for parsing the option field for the at least one session identifier, and copying the at least one session identifier into a binding cache entry of the binding cache entry table in association with the mobile access gateway. In a particular embodiment, the network element includes a local mobility anchor.

Example Embodiments

Figure 1:
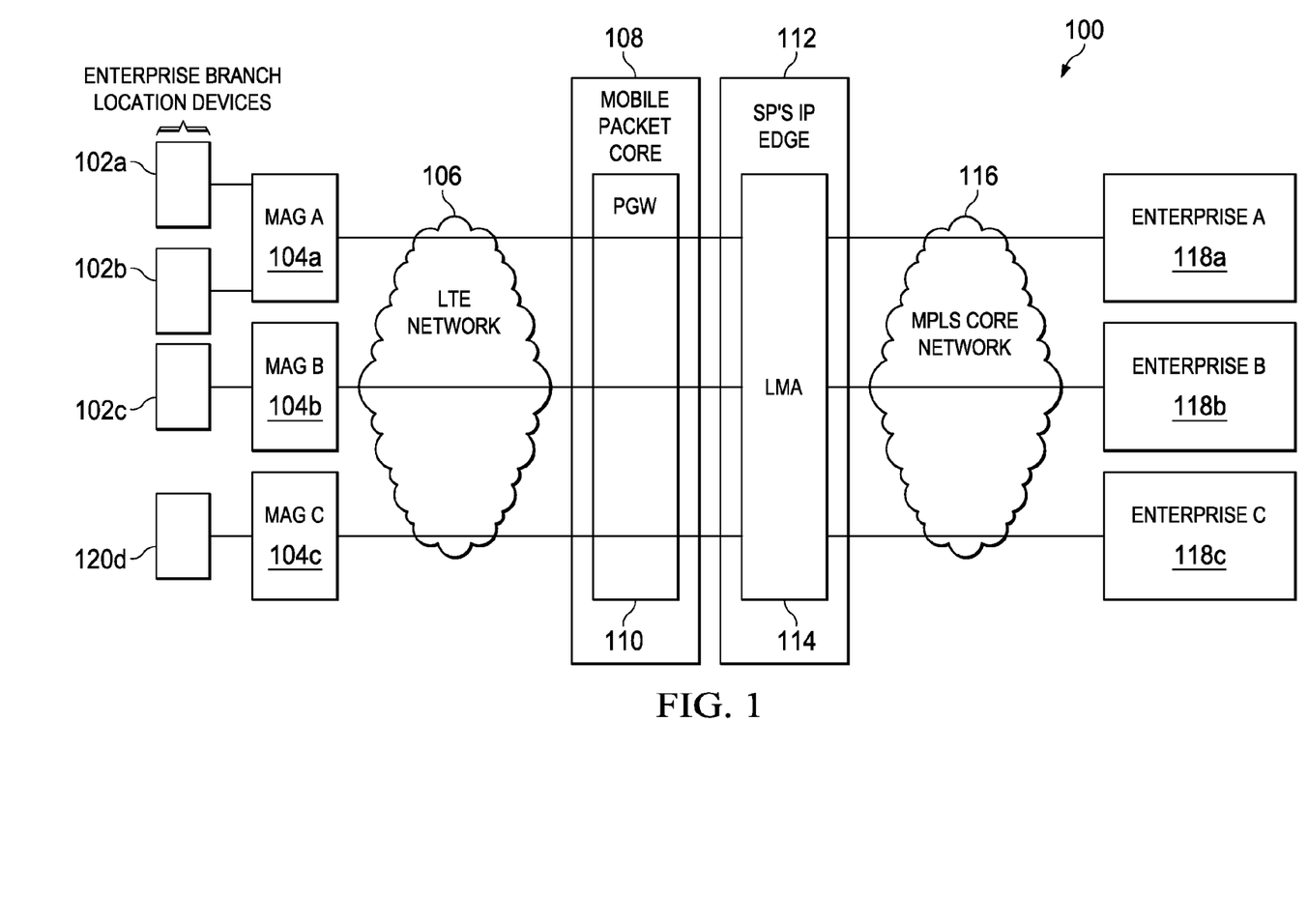
FIG. 1 is a simplified block diagram of a communication system for providing subscriber awareness for a mobile private network routing service in a network environment in accordance with one embodiment of the present disclosure.

Referring now to FIG. 1, FIG. 1 is a simplified block diagram of a communication system for providing subscriber awareness for a mobile private network routing service in a network environment in accordance with one embodiment of the present disclosure. Communication system 100 includes a first enterprise branch location device 102a, a second enterprise branch location device 102b, a third enterprise branch location device 102c, and a fourth enterprise branch location device 102d, a first mobile access gateway (MAG) 104a (MAG A), a second MAG 104b (MAG B), a third MAG 104c (MAG C), an LTE network 106, a mobile packet core 108 including a packet gateway 110, a service provider's IP edge 112 including a local mobility anchor (LMA) 114, a Multiprotocol Label Switching (MPLS) core network 116, and a first enterprise server 118a (Enterprise A), a second enterprise server 118b (Enterprise B), and a third enterprise server 118c (Enterprise C).

First enterprise branch location device 102a and second enterprise branch location device 102b are in communication with first MAG 104a located at a branch location shared by enterprises Enterprise A and Enterprise B, third enterprise branch location device 102c is in communication with second MAG 104b located at an Enterprise B branch location, and fourth enterprise branch location device 102d is in communication with third MAG 104c located at an Enterprise C branch location. In one or more embodiments, each of first MAG 104a, second MAG 104b, and third MAG 104c are mobile access gateway (MAG) protocol functions hosted within a wireless communication device, such as a long term evolution (LTE) router. In particular embodiments, enterprise branch location devices 102a-102d are each in communication with the respective MAGs 104a-104c via a wired connection and/or a wireless communication. In one or more embodiments, first enterprise branch location device 102a, second enterprise branch location device 102b, third enterprise branch location device 102c, fourth enterprise branch location device 102d, first MAG 104a, second MAG 104b, and third MAG 104c are located at one or more customer premises. In the particular embodiment illustrated in FIG. 1, first enterprise branch location device 102a, second enterprise branch location device 102b, and MAG A 104a are located at a branch location shared by enterprises Enterprise A and Enterprise B; third enterprise branch location device 102c and second MAG 104b are located at Enterprise B branch location; and enterprise branch location device 102d and third MAG 104c are located at Enterprise C branch location. In particular embodiments, first MAG 104a is configured as a multi-tenant Customer Premises Equipment (CPE) to share resources across multiple customers sharing a common premises, such as a building, and common network connectivity; and second MAG 104b and third MAG 104c are each configured as single tenant Customer Premise Equipment (CPE) to provide resources to a single customer instance.

One or more of first enterprise branch location device 102a, second enterprise branch location device 102b, third enterprise branch location device 102c, and fourth enterprise branch location device 102d communicate with respective enterprise servers 118a-118c via their connection to the respective MAGs 104a-104c. In particular embodiments, one or more of first enterprise branch location device 102a, second enterprise branch location device 102b, third enterprise branch location device 102c, and fourth enterprise branch location device 102d may include a point-of-sale (POS) machine, a vending machine, an automatic teller machine (ATM), a branch office device, a machine-to-machine (M2M) device, etc.

Each of first MAG 104a, second MAG 104b, and third MAG 104c are in communication with PGW 110 within mobile packet core 108 via LTE network 106. Each of first MAG 104a, second MAG 104b, and third MAG 104c functions to manage mobility-related signaling to LMA 114 on behalf of the respective enterprise branch location devices 102a-102d that are attached to its access link. In particular embodiments, each of first MAG 104a, second MAG 104b, and third MAG 104c may be located within a mobile router in communication with PGW 110 via LTE network 106.

PGW 110 is in communication with LMA 114 within service provider's IP edge 112. LMA 114 functions as a home agent for each of first MAG 104a, second MAG 104b, and third MAG 104c for each of enterprise branch location devices 102a-102d and serves as an anchor point for the home network prefix(es) and is the entity that manages the binding state on behalf of each of enterprise branch location devices 102a-102d. In particular embodiments, LMA 114 has the functional capabilities of a home agent as defined in Mobile IPv6 base specification as defined in RFC3775 with the additional capabilities required for supporting Proxy Mobile IPv6 protocol as defined in this RFC 5213. LMA 114 is in further communication with each of first enterprise server 118a, second enterprise server 118b, and third enterprise server 118c via MPLS core network 116.

In accordance with one or more embodiments, business VPN service logic is hosted on a network node outside PGW 110 and defines some interworking between PGW 110 and the service function. In accordance with one or more embodiments, PGW 110 in the transit path performs service authorization based on LTE subscription data. PGW 110 functions as a gatekeeper to the service function and additionally decorates control-plane traffic to the service function with additional information elements related to the LTE service. These information elements aid the service function in enabling the business VPN service to act as an extension to LTE service. Although various embodiments described herein are described using LTE services and business VPN services, it should be understood that other embodiments may be directed to any service provided between a remote mobile device and a server.

In accordance with various embodiments, PGW 110 ensures that control plane traffic to the service function are from the CPE devices authorized for VPN service and may will include information elements which are essential for service diagnostics and accounting service correlation.

In order to provide a private network routing service to enterprise customers through cellular networks, one or more of MAG 104a-104c is equipped with a radio interface module to establish a connection to the LMA 114. In a particular embodiment LMA 114 is located within an access router within the wireless network operator's core MPLS/IP network. In particular embodiments, a communication protocol used between each of MAG 104a-104c and LMA 114 is Proxy Mobile IP v6 (PMIPv6). PMIPv6 is a network-based mobility management protocol standardized by IETF as specified in RFC 5213 for building a common and access technology independent of mobile core networks, accommodating various access technologies such as LTE, WiMAX, 3GPP, 3GPP2 and WLAN based access architectures.

Due to various reasons (e.g. an external radio interface module), LMA 114 doesn't have a reliable mechanism to get trusted identifiers of the connecting MAG 104a-104c via PMIPv6 signaling. Trusted identifiers for MAG 104a-104c are crucial for authorizing the enterprise, for accurate accounting and for deploying and operating a private network routing service in the wireless operator's network. In accordance with one or more embodiments, PGW 110, situated between MAG 104a-104c and LMA 114, provides a 3G/4G wireless connection to the radio interface module (RIM) in one or more of MAG 104a-104c and has secure access to the RIM identifiers, e.g. IMSI, associated with each of MAG 104a-104c. Since the RIM is authenticated, authorized and trusted by the wireless operator's network, PGW 110 can potentially provide these trusted identifiers to LMA 114 to address the above identified issue as will be further described herein.

In accordance with various embodiments, PGW 110 intercepts a PMIPv6 proxy binding update (PBU) message received from a particular MAG 104a-104c, inserts subscriber session information needed by LMA 114 and sends the subscriber session information to LMA 114. A PBU message is a PMIPv6 control plane request message sent by a mobile access gateway, such as one or more of MAG 104a-104c, to LMA 114 for establishing a binding between the mobile node's home network prefix(es) assigned to a given interface of a mobile node and its current care-of address (Proxy-CoA). In an example operation of PGW 110 according to at least one embodiment, when configured for subscriber continuity, PGW 119 performs Deep Packet Inspection (DPI) on the packets sent by one or more of MAG 104a in order to identify the PBU message. In a particular embodiment, the native IPv6 PBU is identified as having a Next Header field=135 in the IPv6 header and IPv4 PBU is identified as having UDP port=5436. Once the PBU message is intercepted, if authorized by the wireless operator's policy, PGW 110 constructs and appends a new Vendor Specific Mobility Option to the original PBU. This option may include the MAG's International Mobile Subscriber Identity (IMSI), Mobile Station International Subscriber Directory Number (MSISDN), Mobile Directory Number (MDN), Access Point Name (APN), Virtual Routing and Forwarding (VRF) name and other relevant information.

After the PBU message is modified, PGW 110 delivers the modified message to LMA 114. Subsequently, LMA 114 may send a Proxy Binding Acknowledgement (PBA) message to the MAG (from which it received the PBU) via PGW 110. A PBA message is a reply message sent by a LMA 114 in response to receiving the PBU message. In accordance with one or more embodiments, the PBA message from LMA 114 is not intercepted/modified by PGW 110 but is instead passed on to one of MAG 104a-104c.

In an example operation of LMA 114, if explicitly configured for subscriber continuity LMA 114 handles the PBU message in a special manner. First, LMA 114 looks for the presence of the new VSMO. If the VSMO is absent, the PBU message is rejected with a "Administratively prohibited" message. If the VSMO is present in the PBU message, session and/or subscriber related information such as the IMSI, MSISDN, MDN, APN, VRF, etc., is extracted from the VSMO and saved in a binding cache entry of LMA 114 in association with the particular MAG 104a-104c that sent the PBU message. If all processing of the PBU message succeeds, LMA 114 sends a successful PBA message to the particular MAG 104a-104c to establish the PMIPv6 session.

In one or more embodiments, PGW 110 performs a VPN service authorization check for the International Mobile Subscriber Identity (IMSI) associated with a GTP-U tunnel on which the PMIPv6 PBU was received, and allows the PMIPv6 control plane traffic to pass PGW 110 towards LMA 114 only when the authorization check passes, and dropping the PMIPv6 control plane traffic when the VPN authorization check fails. In particular embodiments, LMA 114 removes the VMSO and subtracts the length of the VSMO from the length field in the PBU header before performing any integrity checks on the PBU when an authentication option is included. In one or more embodiments, LMA 114 extracts the information elements from the VMSO, associates them with the PMIPv6 session, and uses them in business VPN service logic. In particular embodiments, LMA 114 may report the LTE session identifiers in accounting records generated by LMA 114 for the PMIPv6 session. In other particular embodiments, LMA 114 may include the session identifiers in a PMIPv6 session command line interface (CLI), enabling an operator to correlate the LTE session and the PMIPv6 sessions. In other embodiments, LMA 114 may also include the session identifiers in any accounting messages that are generated and sent to one or more authentication, authorization, and accounting (AAA) servers.

Figure 2A:
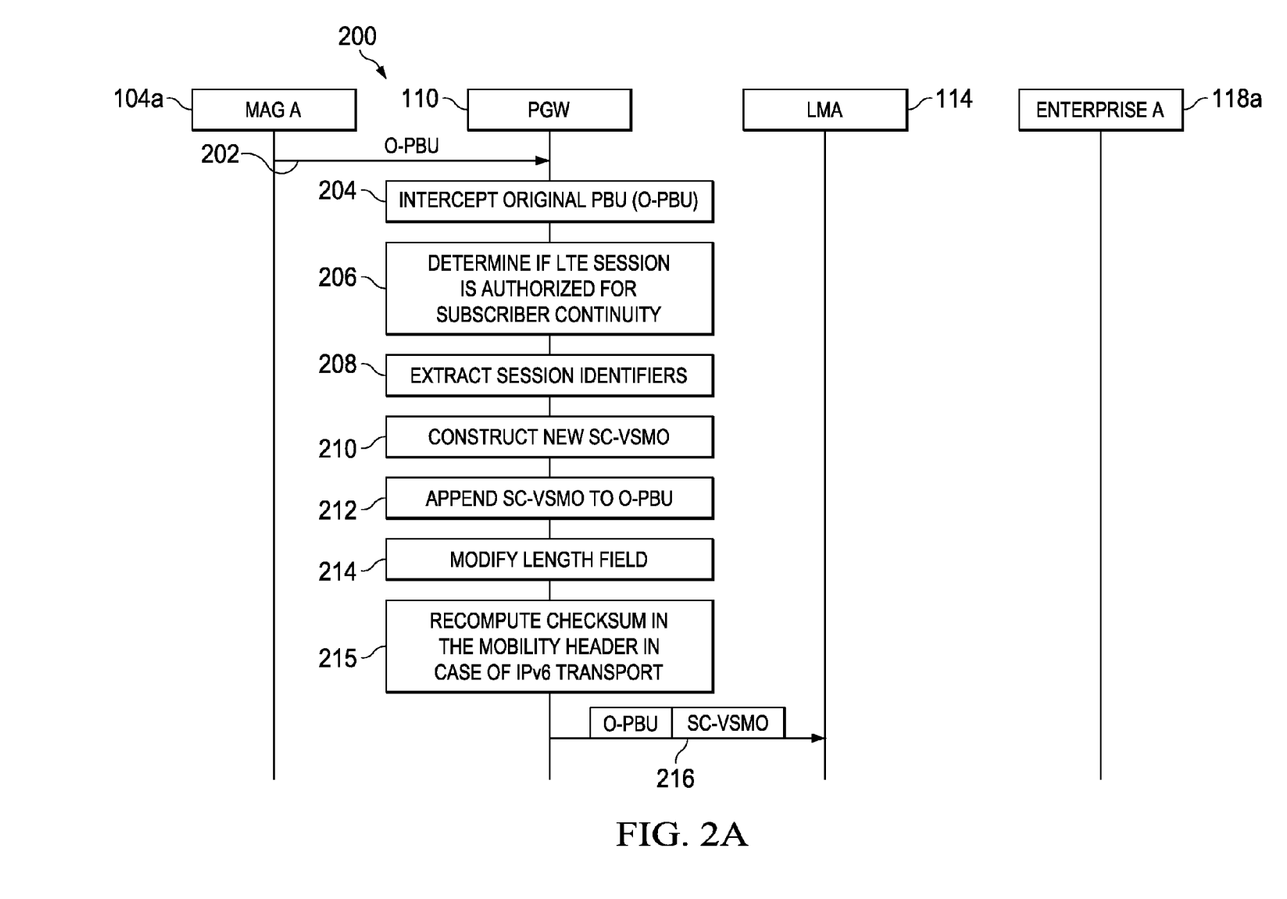
FIGS. 2A-2C illustrate a simplified flow diagram depicting a flow associated with providing subscriber awareness for a mobile private network routing service in a network environment in accordance with one embodiment of the present disclosure.
Figure 2B:
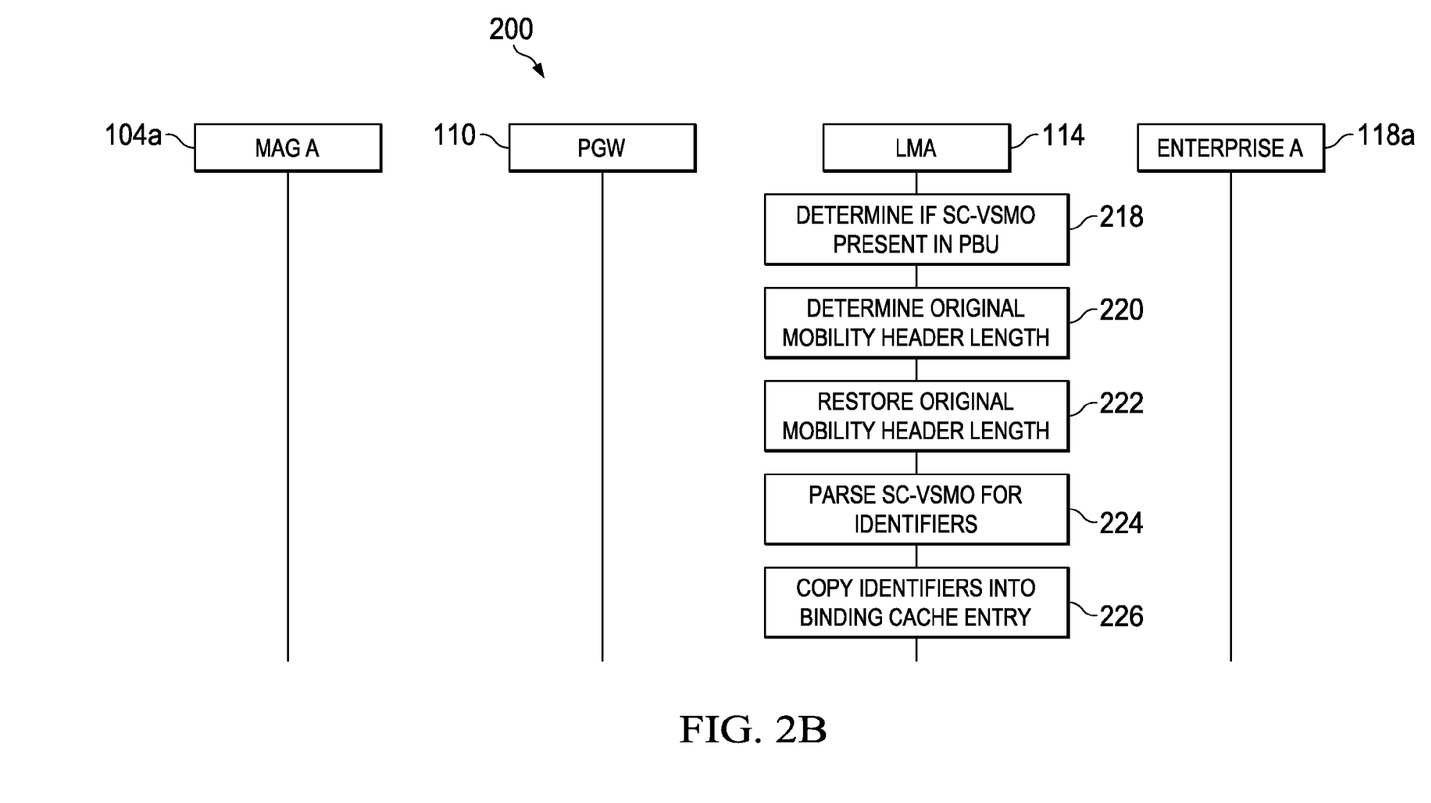
Figure 2C:
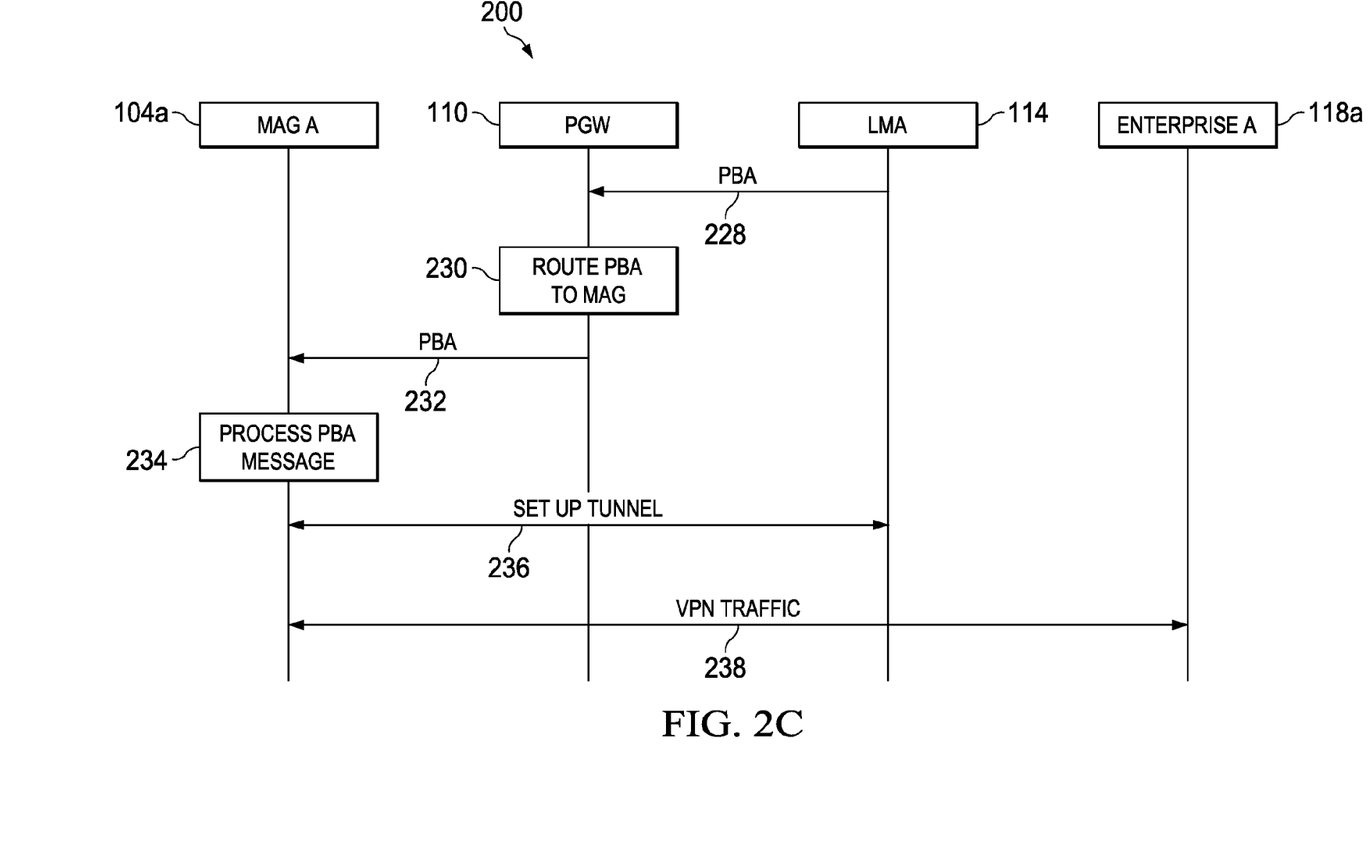

Referring now to FIGS. 2A-2C, FIGS. 2A-2C illustrate a simplified flow diagram depicting a flow 200 associated with providing subscriber awareness for a mobile private network routing service in a network environment in accordance with one embodiment of the present disclosure. In 202, first MAG 104a (MAG A) constructs an original proxy binding update (O-PBU) message and sends the original PBU (O-PBU) message addressed to LMA 114 via PGW 110 as control plane traffic. In 204, PGW 110 performs packet inspection and intercepts the O-PBU message. In one or more embodiments, PGW 110 is configured to intercept PMIP control plane traffic having a destination address matching a set of LMA IP addresses associated with LMA 114. In a particular embodiment, PGW 110 intercepts IP user datagram protocol (UDP) packets to a particular destination port (e.g., destination port 5436) and matching a particular destination IP address. In particular embodiments in which an IPv6 protocol is used, PGW 110 may determine whether the packets match a IPv6 Mobility Header packets having a mobility header (MH) type of PBU.

In 206, PGW 110 determines if the LTE session on which O-PBU was received is authorized for subscriber continuity. if authorized, then PGW 110 extracts session identifiers from the LTE session in 208. In particular embodiments, the session identifiers may include one or more of a Network Access Identifier (NAI), International Mobile Subscriber Identity (IMSI), Mobile Station International Subscriber Directory Number (MSISDN), Access Point Name (APN), and Name of the transport VRF used for the underlying session. In still other embodiments, the session identifiers may include any other suitable identifier. In 210, PGW 110 constructs a Subscriber Continuity Vendor Specific Mobility Option (SC-VSMO) field including one or more of the session identifiers. In 212, PGW 110 appends the SC-VSMO field to the O-PBU forming a new PBU of the format (O-PBU|SC-VSMO). In 214, PGW 110 modifies the length field in the O-PBU mobility header to include the length of SC-VSMO, but does not recompute the contents of Authentication Option in the O-PBU. In 215, PGW 110 recomputes the checksum in PBU header 300 (FIG. 3) in case a IPv6 protocol is used for transport between MAG 104a-104c, PGW 100 and LMA 114. In 216, PGW 110 sends the new PBU to LMA 114. If in 206, PGW 110 determines that LMA 114 is known not to support the Subscriber Continuity feature, then PGW 110 forwards the O-PBU as it is to LMA 114.

In 218, LMA 114 determines whether the SC-VSMO is present in the PBU. If the SC-VSMO is present in the PBU, in 220 LMA 114 determines the original mobility header length in the O-PBU (as received by PGW 110 from first MAG 104a), and in 222 LMA 114 restores the original mobility header length in the mobility header before validating the authentication option, if present, in the O-PBU. In 224, LMA 114 parses the SC-VSMO and in 226 LMA 114 copies the session identifiers from the SC-VSMO into a binding cache entry (BCE) in association with first MAG 104a. The BCE contains mobility binding information which allows LMA 114 to tunnel VPN traffic between first MAG 104a and a server, such as first enterprise server 118a using one or more virtual tunnels. In particular embodiment, the session identifiers are displayed in a show binding output. If it is determined in 218 that the SC-VSMO is not present, whereas LMA 114 is configured for Subscriber Continuity feature (to expect SC-VSMO in PBU packet), then LMA 114 discards the PBU. If LMA 114 is not configured for the Subscriber Continuity feature and the SC-VSMO is present in the PBU, then LMA 114 ignores the SC-VSMO.

In 228, LMA 114 sends a PBA message addressed to first MAG 104a via PGW 110. In 230, PGW 110 normally routes the PBA to first MAG 104a without performing any inspection and/or change to the PBA. In 232, the PBA is received by first MAG 104a from PGW 110. In 234, first MAG 104a processes the PBA message received from LMA 114 via PGW 110. In 236, one or more tunnels are setup between first MAG 104a and LMA 114 using the session identifiers. In 238, VPN traffic is communicated between first MAG 104a and enterprise server 118a utilizing the one or more tunnels established between first MAG 104a and LMA 114. In one or more embodiments, first MAG 104a receives the VPN traffic communicated between first MAG 104a and enterprise server 118a from one or more of first enterprise branch location device 102a and second enterprise branch location device 102b.

Figure 3A:
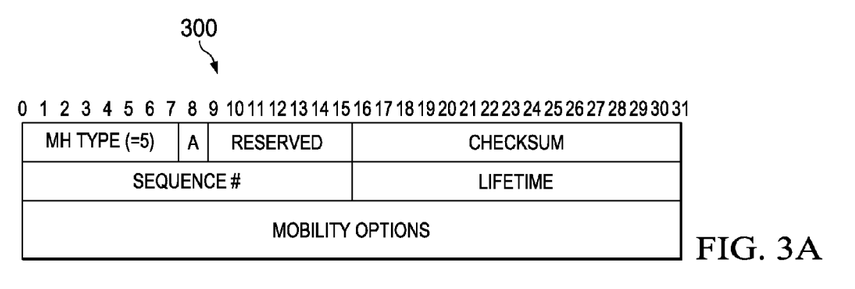
FIG. 3A illustrates an example of a proxy binding update (PBU) message format according to one embodiment.

Referring now to FIG. 3A, FIG. 3A illustrates an example of a proxy binding update (PBU) message format 300 according to one embodiment. In one or more embodiments, PBU message format 300 may be used in the PBU message described with respect to FIGS. 2A-2C. The PBU message format 300 includes a mobility header (MH) type field, an A bit, a reserved field, a checksum field, a sequence number field, a lifetime field, and a mobility options field. The MH type field is an 8-bit field that defines the type of the mobility header. In the particular embodiment illustrated in FIG. 3A, the MH type field includes a value of 5 indicative of the message being a proxy binding update message. The A bit represents an acknowledgement bit that is set by the sending mobile node to request a proxy binding acknowledgement message to be returned upon receipt of the PBU message. The reserved field represents a field that is reserved for later use. The checksum field is 16-bit information for detecting a message transport error, and the sequence number is 16-bit information representing the packet sequence of the PBU message. The lifetime field is 16-bit information representing the lifetime of the PBU message and the mobility options field may include one or more mobility options such as those described by RFC 3775 such as binding update authorization data and/or an alternate care-of-address option. In one or more embodiments, the PBU message may further include one or more mobility options such as those defined in RFC 5213.

Figure 3B:
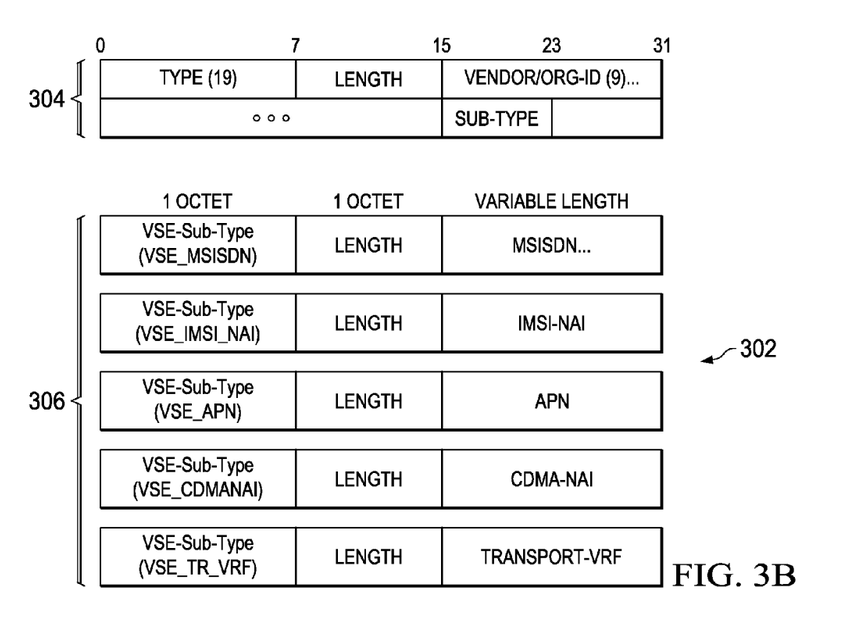
FIG. 3B illustrates an example of a format for a vendor-specific mobility option (VSMO) field for appending to a PBU message according to one embodiment.

Referring now to FIG. 3B, FIG. 3B illustrates an example of a format for a vendor-specific mobility option (VSMO) field 302 for appending to a PBU message according to one embodiment. In one or more embodiments, the VSMO is appended to a PBU message by PGW 110. VSMO format 302 includes a first portion 304 and second portion 306. First portion 304 includes a type field indicative of type of the vendor specific option (type 19), a length field indicative of the total length of the vendor specific extension, a vendor/organization-ID field indicative of a vendor or organization associated with the vendor specific option, and a sub-type field indicative of a specific extension for the vendor or organization. Second portion 306 includes one or more subscriber identity portions and/or session identity portions associated with a MAG in communication with a packet gateway (PGW), such as first MAG 104a. In one or more embodiments each subscriber/session identity portion includes a sub-option type field indicative of a type of a subscriber/session identity, a length field indicative of a length of the subscriber/session identity, and a subscriber identity field including the subscriber/session identity. The particular embodiment illustrated in FIG. 3B includes five different subscriber identifiers within second portion 306.

The first subscriber identifier includes a VSE_SubOption_ Type field indicative of the subscriber identifier including a Mobile Station International Subscriber Directory Number (MSISDN) (e.g., VSE_SubOption_Type=1), a length field indicative of a length of an MSISDN field that follows, and an MSISDN field including the MSISDN associated with the MAG. The second subscriber identifier includes a VSE_SubOption_Type field indicative of the subscriber identifier including an International Mobile Subscriber Identity (IMSI)-based Network Access Identifier (NAI) (e.g., VSE_SubOption_Type=2), a length field indicative of a length of the IMSI-NAI field that follows, and an IMSI-NAI field including the IMSI-NAI associated with the MAG. The third subscriber identifier includes a VSE_SubOption_Type field indicative of the subscriber identifier including an Access Point Name (APN) (e.g., VSE_SubOption_Type=3), a length field indicative of a length of the APN field that follows, and an APN field including the APN associated with the MAG. The fourth subscriber identifier includes a VSE_SubOption_Type field indicative of the subscriber identifier including a CDMA-NAI (e.g., VSE_ SubOption_Type=4), a length field indicative of a length of the CDMA-NAI field that follows, and a CDMA-NAI field including the CDMA-NAI associated with the MAG. The fifth subscriber identifier includes a VSE_SubOption_Type field indicative of the subscriber identifier including a virtual routing and forwarding (VRF) name (e.g., VSE_SubOption_ Type=5), a length field indicative of a length of the VRF name field that follows, and a VRF name field including a transport VRF name associated with the MAG.

Figure 3C:
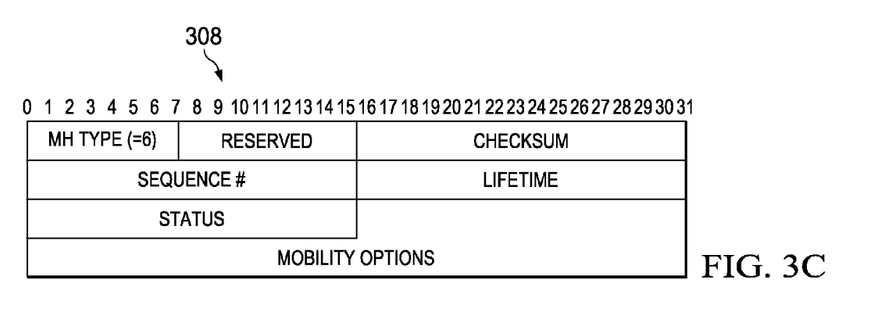
FIG. 3C illustrates an example of a proxy binding acknowledgement (PBA) message format according to one embodiment.

Referring now to FIG. 3C, FIG. 3C illustrates an example of a proxy binding acknowledgement (PBA) message format 308 according to one embodiment. In one or more embodiments, PBA message format 308 may be used in the PBA message described with respect to FIGS. 2A-2C. The PBA message format 308 includes a mobility header (MH) type field, a reserved field, a checksum field, a sequence number field, a lifetime field, a status field, and a mobility options field. The MH type field is an 8-bit field that defines the type of the mobility header. In the particular embodiment illustrated in FIG. 3A, the MH type field includes a value of 6 indicative of the message being a proxy binding acknowledgment message. The reserved field represents a field that is reserved for later use. The checksum field is 16-bit information for detecting a message transport error, and the sequence number is 16-bit information representing the packet sequence of the PBA message. The lifetime field is 16-bit information representing the lifetime of the PBA message. The status field includes 16-bit information representing a binding result, and the mobility options field may include one or more mobility options such as those described by RFC 3775, RFC 5123, etc.

Figure 4:
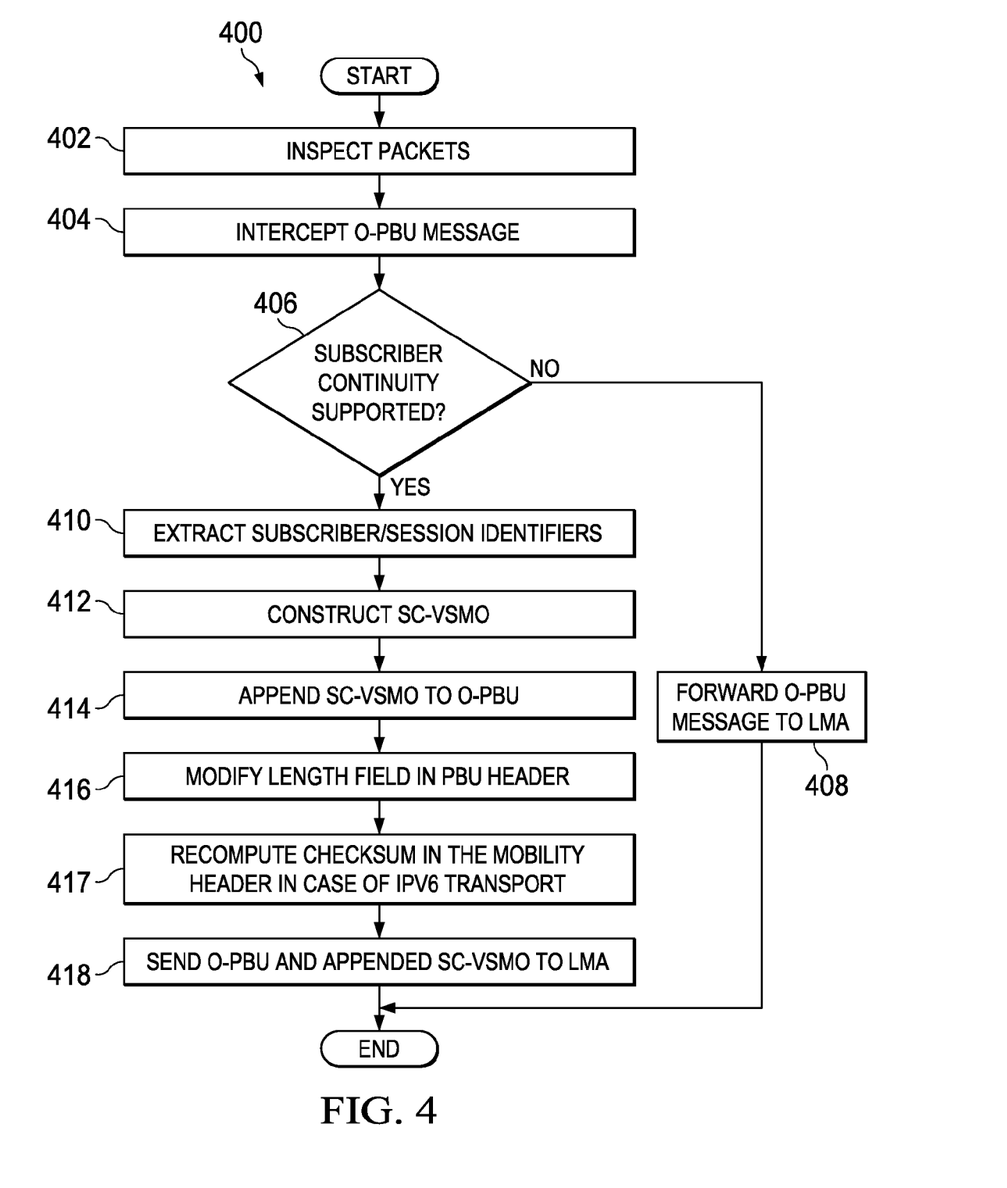
FIG. 4 is a simplified flowchart that illustrates example operations associated with a packet gateway (PGW) in accordance with one embodiment.

Referring now to FIG. 4, FIG. 4 is a simplified flowchart 400 that illustrates example operations associated with a packet gateway (PGW) in accordance with one embodiment. In 402, PGW 110 inspects packets received from MAGs 104a-104c. In 404, PGW 110 intercepts a first original PBU (O-PBU) message, having a destination address associated with LMA 114. In a particular embodiment, may determine whether the packets match a IPv6 Mobility Header packets having a mobility header (MH) type of PBU or UDP port=5436. In 406, PGW 110 determines if the O-PBU is destined for an LMA e.g., LMA 114) that is known to support the subscriber continuity feature. If in 406 PGW 110 determines that LMA 114 is not known to support the subscriber continuity feature, then PGW 110 forwards the O-PBU to LMA 114 without change in 408 and then the operations end.

If in 406 PGW 110 determines if the LTE session on which O-PBU was received is authorized for Subscriber Continuity, then PGW 110 extracts session identifiers from the O-PBU in 410. In particular embodiments, the session identifiers may include one or more of a NAI Network Access Identifier (NAI), International Mobile Subscriber Identity (IMSI), Mobile Station International Subscriber Directory Number (MSISDN), Access Point Name (APN), and Name of the VRF used for the underlying session. In 412, PGW 110 constructs a Subscriber Continuity Vendor Specific Mobility Option (SC-VSMO) field. In 414, PGW 110 appends the SC-VSMO field to the O-PBU to generate a second binding update message, such as a new PBU message, of the format (O-PBU|SC-VSMO). In 416, PGW 110 modifies the length field in the O-PBU mobility header to include the length of SC-VSMO, but does not recompute the contents of Authentication Option in the O-PBU. In 417, PGW 110 recomputes the checksum in PBU header 300 (FIG. 3) if IPv6 protocol transport is used. In 418, PGW 110 sends the new PBU including the O-PBU and the appended SC-VSMO to LMA 114. The operations then end.

Figure 5:
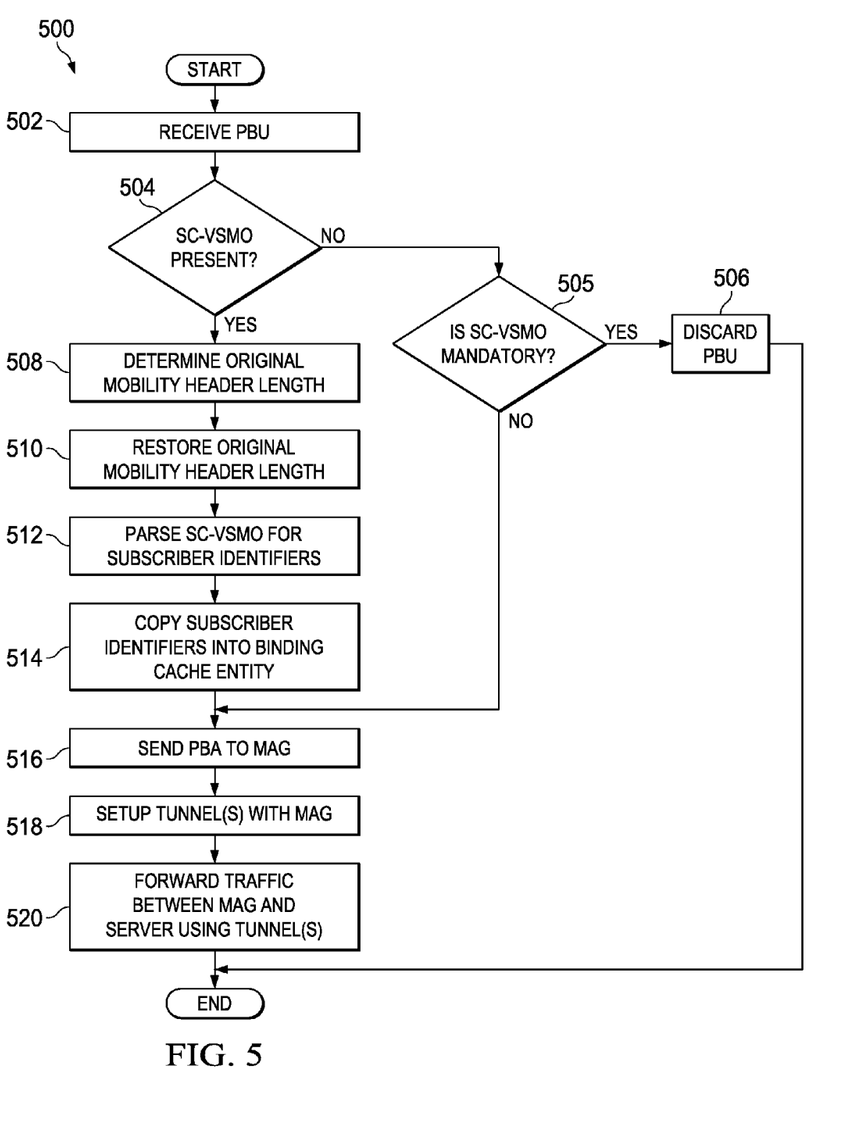
FIG. 5 is a simplified flowchart that illustrates example operations associated with a local mobility anchor (LMA) in accordance with one embodiment.

Referring now to FIG. 5, FIG. 5 is a simplified flowchart 500 that illustrates example operations associated with a local mobility anchor (LMA) in accordance with one embodiment. In 502, LMA 114 receives a PBU from PGW 110 which may be modified to include an appended SC-VSMO. In 504, LMA 114 determines whether the SC-VSMO is present in the PBU. If it is determined in 504 that the SC-VSMO is not present whereas the LMA 114 is configured to expect SC-VSMO in a PBU, then in 505 LMA 114 determines whether the SC-VSMO in mandatory. If the SC-VSMO is determined to be mandatory, LMA 114 discards the PBU in 506 and the operations end. If the SC-VSMO is not determined to be mandatory, the operations continue to 516. If it is determined in 504 that the SC-VSMO is present in the PBU, in 508 LMA 114 determines the original mobility header length in the O-PBU (as received by PGW 110 from first MAG 104a). In 510, LMA 114 restores the original mobility header length in the mobility header before validating the authentication option, if present, in the O-PBU. In 512, LMA 114 parses the SC-VSMO for the subscriber identifiers. In 514, LMA 114 copies the session identifiers from the SC-VSMO into a binding cache entry (BCE) in association with first MAG 104a. The BCE contains mobility binding information which allows LMA 114 to tunnel traffic between first MAG 104a and a server, such as first enterprise server 118a, using one or more virtual tunnels.

In 516, LMA 114 sends a PBA message addressed to first MAG 104a via PGW 110 in which PGW 110 normally routes the PBA to first MAG 104a without performing any inspection and/or change to the PBA. In response to receiving and processing of the PBA by first MAG 104a, in 518 one or more tunnels are setup between first MAG 104a and LMA 114. In 520, VPN traffic is communicated between first MAG 104a and a server, such as enterprise server 118a, utilizing the one or more tunnels established between first MAG 104a and LMA 114. In one or more embodiments, first MAG 104a receives the traffic communicated between first MAG 104a and enterprise server 118a from one or more enterprise branch location devices such as first enterprise branch location device 102a and second enterprise branch location device 102b. The operations then end.

Figure 6:
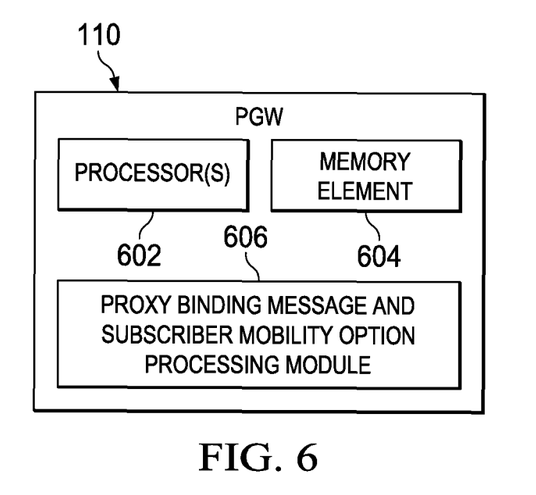
FIG. 6 is a simplified block diagram of a PGW in accordance with one embodiment.

Referring now to FIG. 6, FIG. 6 is a simplified block diagram of PGW 110 in accordance with one embodiment. PGW 110 includes one or more processors 602, a memory element 604, and a proxy binding message and subscriber mobility option processing module 606. Processor(s) 602 is configured to execute various tasks of PGW 110 as described herein and memory element 604 is configured to store data associated with PGW 110. Proxy binding message and subscriber mobility option processing module 606 is configured to perform the various proxy binding message and subscriber mobility option processing functions of PGW 110 as described herein.

Figure 7:
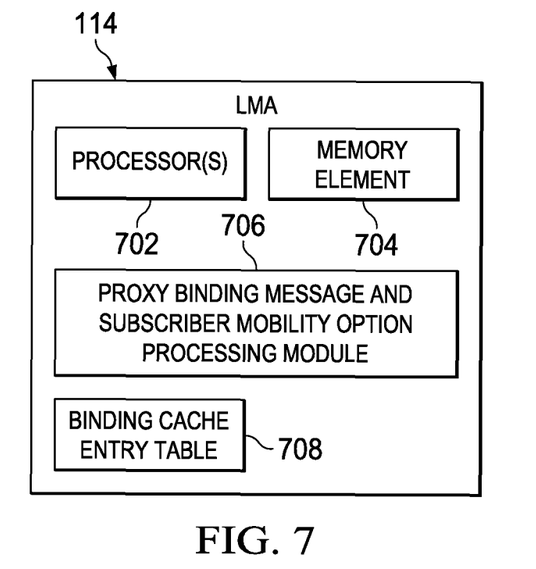
FIG. 7 is a simplified block diagram of a LMA in accordance with one embodiment.

Referring now to FIG. 7, FIG. 7 is a simplified block diagram of LMA 114 in accordance with one embodiment. LMA 114 includes one or more processors 702, a memory element 704, and a proxy binding message and subscriber mobility option processing module 706. Processor(s) 702 is configured to execute various tasks of LMA 114 as described herein and memory element 704 is configured to store data associated with LMA 114. Proxy binding message and subscriber mobility option processing module 706 is configured to perform the various proxy binding message and subscriber mobility option processing functions of LMA 114 as described herein. Binding cache entry table 708 is configured to store one or more binding cache entries including subscriber identifiers associated with one or more MAGs, such as one or more of MAGs 104a-104c. In a particular embodiment, the subscriber identifiers include one or more of a NAI Network Access Identifier (NAI), International Mobile Subscriber Identity (IMSI), Mobile Station International Subscriber Directory Number (MSISDN), Access Point Name (APN), and Name of the VRF used for an underlying session.

In one example implementation, enterprise branch location devices 102a-102d, MAGs 104a-104c, PGW 110, LMA 114, and enterprise servers 118a-118c are network elements that facilitate or otherwise help coordinate subscriber awareness activities (e.g., for networks such as those illustrated in FIG. 1). As used herein in this Specification, the term 'network element' is meant to encompass network appliances, servers, routers, switches, gateways, bridges, loadbalancers, firewalls, processors, modules, base stations, or any other suitable device, component, element, or object operable to exchange information in a network environment. Moreover, the network elements may include any suitable hardware, software, components, modules, interfaces, or objects that facilitate the operations thereof. This may be inclusive of appropriate algorithms and communication protocols that allow for the effective exchange of data or information.

In one example implementation, enterprise branch location devices 102a-102d, MAGs 104a-104c, PGW 110, LMA 114, and/or enterprise servers 118a-118c include software to achieve the operations, as outlined herein in this document. In other embodiments, this feature may be provided external to these elements, or included in some other network device to achieve this intended functionality. Alternatively, both elements include software (or reciprocating software) that can coordinate in order to achieve the operations, as outlined herein. In still other embodiments, one or both of these devices may include any suitable algorithms, hardware, software, components, modules, interfaces, or objects that facilitate the operations thereof.

In regards to the internal structure associated with communication system 100, each of enterprise branch location devices 102a-102d, MAGs 104a-104c, PGW 110, LMA 114, and enterprise servers 118a-118c can include memory elements for storing information to be used in achieving the operations, as outlined herein. Additionally, each of these devices may include a processor that can execute software or an algorithm to perform the activities as discussed in this Specification. These devices may further keep information in any suitable memory element [random access memory (RAM), read only memory (ROM), an erasable programmable read only memory (EPROM), an electrically erasable programmable ROM (EEPROM), etc.], software, hardware, or in any other suitable component, device, element, or object where appropriate and based on particular needs. Any of the memory items discussed herein should be construed as being encompassed within the broad term 'memory element.' The information being tracked or sent to enterprise branch location devices 102a-102d, MAGs 104a-104c, PGW 110, LMA 114, and enterprise servers 118a-118c could be provided in any database, register, control list, cache, or storage structure: all of which can be referenced at any suitable timeframe. Any such storage options may be included within the broad term 'memory element' as used herein in this Specification. Similarly, any of the potential processing elements, modules, and machines described in this Specification should be construed as being encompassed within the broad term 'processor.' Each of the network elements and mobile nodes can also include suitable interfaces for receiving, transmitting, and/or otherwise communicating data or information in a network environment.

Note that in certain example implementations, the functions outlined herein may be implemented by logic encoded in one or more tangible media (e.g., embedded logic provided in an application specific integrated circuit [ASIC], digital signal processor [DSP] instructions, software [potentially inclusive of object code and source code] to be executed by a processor, or other similar machine, etc.). In some of these instances, memory elements [as shown in FIGS. 6 and 7] can store data used for the operations described herein. This includes the memory elements being able to store software, logic, code, or processor instructions that are executed to carry out the activities described in this Specification. A processor can execute any type of instructions associated with the data to achieve the operations detailed herein in this Specification. In one example, the processors [as shown in FIGS. 6 and 7] could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array [FPGA], an EPROM, an EEPROM) or an ASIC that includes digital logic, software, code, electronic instructions, or any suitable combination thereof.

Note that with the examples provided above, as well as numerous other examples provided herein, interaction may be described in terms of two, three, or four network elements. However, this has been done for purposes of clarity and example only. In certain cases, it may be easier to describe one or more of the functionalities of a given set of flows by only referencing a limited number of network elements. It should be appreciated that communication system 100 (and its teachings) are readily scalable and further can accommodate a large number of components, as well as more complicated/sophisticated arrangements and configurations. Accordingly, the examples provided should not limit the scope or inhibit the broad teachings of communication system 100 as potentially applied to a myriad of other architectures.

It is also important to note that the previously described activities illustrate only some of the possible signaling scenarios and patterns that may be executed by, or within, communication system 100. Some of these steps may be deleted or removed where appropriate, or these steps may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by communication system 100 in that any suitable arrangements, chronologies, configurations, and timing mechanisms may be provided without departing from the teachings of the present disclosure.

Although the present disclosure has been described in detail with reference to particular arrangements and configurations, these example configurations and arrangements may be changed significantly without departing from the scope of the present disclosure. For example, although the present disclosure has been described with reference to particular communication exchanges involving certain network access, and signaling protocols, communication system 100 may be applicable to other exchanges, routing protocols, or routed protocols. Moreover, although communication system 100 has been illustrated with reference to particular elements and operations that facilitate the communication process, these elements and operations may be replaced by any suitable architecture or process that achieves the intended functionality of communication system 100.

In a separate endeavor, communication system 100 may generally be configured or arranged to represent a LTE and/or 3G architecture applicable to LTE and/or UMTS environments in accordance with a particular embodiment. However, the LTE architecture is offered for purposes of example only and may alternatively be substituted with any suitable networking system or arrangement that provides a communicative platform for communication system 100. Moreover, the present disclosure is equally applicable to other cellular and/or wireless technology including 3G, CDMA, Wi-Fi, WiMAX, etc.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method, comprising:
   receiving, at a packet gateway, a first binding update message from a mobile access gateway, the first binding update message having a destination address associated with a local mobility anchor;
   extracting at least one session identifier associated with the mobile access gateway from the first binding update message;
   constructing an option field including the at least one session identifier;
   appending the option field to the first binding update message to form a second binding update message; and
   sending the second binding update message to the local mobility anchor.

2. The method of claim 1, further comprising modifying a length field value of a length field of the first binding update message to include a length of the option field and recomputing a checksum field value of a checksum field of the first binding update message.

3. The method of claim 1, wherein the option field includes one or more session identity portions associated with each session identifier, each session identity portion including a sub-option type field indicative of a type of the session identifier, a length field indicative of a length of the session identifier, and a subscriber identity field including the session identifier.

4. The method of claim 1, wherein the at least one session identifier includes one or more of a Mobile Station International Subscriber Directory Number (MSISDN) associated with the mobile access gateway, a Network Access Identifier (NAI) associated with the mobile access gateway, an International Mobile Subscriber Identity (IMSI) associated with the mobile access gateway, an Access Point Name (APN) associated with the mobile access gateway, and a Virtual Routing and Forwarding (VRF) name associated with the mobile access gateway.

5. The method of claim 1, further comprising performing packet inspection for determining the binding update message prior to extracting the at least one session identifier.

6. The method of claim 1, wherein the option field is a vendor specific mobility option field.

7. The method of claim 1, wherein the first binding update message is a proxy binding update (PBU) message.

8. The method of claim 1, further comprising:
   receiving the second binding update message by the local mobility anchor;

determining if the option field is present within the second binding update message;
parsing the option field for the at least one session identifier; and
copying the at least one session identifier into a binding cache entry in association with the mobile access gateway.

9. The method of claim 8, further comprising:
determining, by the local mobility anchor, an original length field value of the length field of the first binding update message; and
restoring the original length field value within a length field of the second binding update message.

10. The method of claim 9, further comprising forwarding traffic between a wired or wireless device connected to the mobile access gateway and a server associated with the wired or wireless device using the one or more tunnels.

11. The method of claim 8, further comprising:
sending a binding acknowledgment message to the mobile access gateway via the packet gateway; and
setting up one or more tunnels between the mobile access gateway and the local mobility anchor using the at least one session identifier.

12. Logic encoded in one or more non-transitory media that includes code for execution and when executed by a processor operable to perform operations comprising:
receiving, at a packet gateway, a first binding update message from a mobile access gateway, the first binding update message having a destination address associated with a local mobility anchor;
extracting at least one session identifier associated with the mobile access gateway from the first binding update message;
constructing an option field including the at least one session identifier;
appending the option field to the first binding update message to form a second binding update message; and
sending the second binding update message to the local mobility anchor.

13. The logic of claim 12, wherein the operations further comprise modifying a length field value of a length field of the first binding update message to include a length of the option field and recomputing checksum field value of a checksum field of the first binding update message.

14. The logic of claim 12, wherein the option field includes one or more session identity portions associated with each session identifier, each session identity portion including a sub-option type field indicative of a type of the session identifier, a length field indicative of a length of the session identifier, and a subscriber identity field including the session identifier.

15. The logic of claim 12, wherein the at least one session identifier includes one or more of a Mobile Station International Subscriber Directory Number (MSISDN) associated with the mobile access gateway, a Network Access Identifier (NAI) associated with the mobile access gateway, an International Mobile Subscriber Identity (IMSI) associated with the mobile access gateway, an Access Point Name (APN) associated with the mobile access gateway, and a Virtual Routing and Forwarding (VRF) name associated with the mobile access gateway.

16. The logic of claim 12, wherein the operations further comprise performing packet inspection to determine the binding update message prior to extracting the at least one session identifier.

17. The logic of claim 12, wherein the option field is a vendor specific mobility option field.

18. The logic of claim 12, wherein the first binding update message is a proxy binding update (PBU) message.

19. Logic encoded in one or more non-transitory media that includes code for execution and when executed by a processor operable to perform operations comprising:
receiving, from a packet gateway, a binding update message by a local mobility anchor;
determining if an option field is present within the binding update message including at least one session identifier associated with a mobile access gateway;
determining, by the local mobility anchor, an original length field value of the length field of the binding update message;
restoring the original length field value within the length field of the binding update message;
parsing the option field for the at least one session identifier; and
copying the at least one session identifier into a binding cache entry in association with the mobile access gateway.

20. The logic of claim of claim 19, wherein the operations further comprise:
sending a binding acknowledgment message to the mobile access gateway via the packet gateway; and
setting up one or more tunnels between the mobile access gateway and the local mobility anchor using the at least one session identifier.

21. The logic of claim 20, wherein the operations further comprise forwarding traffic between a wired or wireless device and a server associated with the wired or wireless device using the one or more tunnels.

22. A network element, comprising:
a memory element configured to store electronic code;
a processor operable to execute instructions associated with the electronic code; and
a module coupled to the memory element and the processor, wherein the network element is configured for:
receiving a first binding update message from a mobile access gateway, the first binding update message having a destination address associated with a local mobility anchor;
extracting at least one session identifier associated with the mobile access gateway from the first binding update message;
constructing an option field including the at least one session identifier;
appending the option field to the first binding update message to form a second binding update message; and
sending the second binding update message to the local mobility anchor.

23. The network element of claim 22, wherein the network element includes a packet gateway.

24. The network element of claim 22, wherein the at least one module is further configured for modifying a length field value of a length field of the first binding update message to include a length of the option field and recomputing checksum field value of a checksum field of the first binding update message.

25. A network element, comprising:
a memory element configured to store electronic code;
a processor operable to execute instructions associated with the electronic code;
a binding cache entry table; and
a module coupled to the memory element, the processor and binding cache entry table, wherein the network element is configured for:

receiving, from a packet gateway, a binding update message by a local mobility anchor;

determining if an option field is present within the binding update message including at least one session identifier associated with a mobile access gateway;

determining an original length field value of the length field of the binding update message;

restoring the original length field value within the length field of the binding update message;

parsing the option field for the at least one session identifier; and copying the at least one session identifier into a binding cache entry of the binding cache entry table in association with the mobile access gateway.

26. The network element of claim 25, wherein the network element includes a local mobility anchor.

* * * * *